United States Patent
Alexander

(10) Patent No.: US 7,318,694 B2
(45) Date of Patent: Jan. 15, 2008

(54) APPARATUS FOR SECURING OBJECTS TO VEHICLES OR TRAILERS

(76) Inventor: Allen Alexander, 5101 NE. 46th Ave., Vancouver, WA (US) 98661

( * ) Notice: Subject to any disclaimer, the term of this patent is extended or adjusted under 35 U.S.C. 154(b) by 15 days.

(21) Appl. No.: 11/188,946

(22) Filed: Jul. 26, 2005

(65) Prior Publication Data

US 2007/0025822 A1   Feb. 1, 2007

(51) Int. Cl.
  *B61D 45/00* (2006.01)
(52) U.S. Cl. ................................... 410/104
(58) Field of Classification Search ............ None
  See application file for complete search history.

(56) References Cited

U.S. PATENT DOCUMENTS

| | | | |
|---|---|---|---|
| 5,137,403 A * | 8/1992 | McCaffrey | 410/51 |
| 5,674,033 A * | 10/1997 | Ruegg | 410/104 |
| 6,585,465 B1 * | 7/2003 | Hammond et al. | 410/104 |
| 6,644,901 B2 * | 11/2003 | Breckel | 410/104 |
| 6,712,568 B2 * | 3/2004 | Snyder et al. | 410/104 |
| 6,769,847 B1 * | 8/2004 | Heilmann | 410/104 |
| 6,971,826 B2 * | 12/2005 | Valentine | 410/50 |
| 7,040,849 B2 * | 5/2006 | Cunningham et al. | 410/104 |
| 7,070,374 B2 * | 7/2006 | Womack et al. | 410/104 |
| 2002/0048495 A1 * | 4/2002 | Anderson et al. | 410/104 |
| 2002/0164225 A1 * | 11/2002 | Snyder et al. | 410/104 |
| 2003/0095846 A1 * | 5/2003 | Breckel | 410/104 |
| 2004/0131439 A1 * | 7/2004 | Womack et al. | 410/104 |
| 2004/0131440 A1 * | 7/2004 | Womack et al. | 410/104 |
| 2005/0036848 A1 * | 2/2005 | Cunningham et al. | 410/104 |
| 2005/0074308 A1 * | 4/2005 | Womack et al. | 410/104 |
| 2005/0117991 A1 * | 6/2005 | Anderson et al. | 410/104 |
| 2005/0214093 A1 * | 9/2005 | Priesgen | 410/104 |
| 2006/0045648 A1 * | 3/2006 | Womack et al. | 410/104 |

* cited by examiner

*Primary Examiner*—H Gutman
(74) *Attorney, Agent, or Firm*—David E. Orr

(57) ABSTRACT

An apparatus for immovably attaching or holding objects to a vehicle, trailer, platform or the like. The apparatus comprises at least two rails. Each rail is fixed and attached to the vehicle or the like, each rail having a channel that runs most of or all the length of the rail. The apparatus further includes at least one attachment device, the attachment device received by the channel of one of the rails, two projections of the rail constraining the attachment device to slide within the rail, whereby the attachment device attaches or secures an object to the rail. The attachment device is made and configured to slide within the one rail, and also configured to be immovably fixed at a desired position within the one rail by operating a locking mechanism that is part of the attachment device. In a preferred embodiment, the locking mechanism comprises cams that wedge against the projections of the rail. Further, by operating the locking mechanism, the attachment device is released or unlocked from the channel so the attachment device can slide within the one rail.

3 Claims, 3 Drawing Sheets

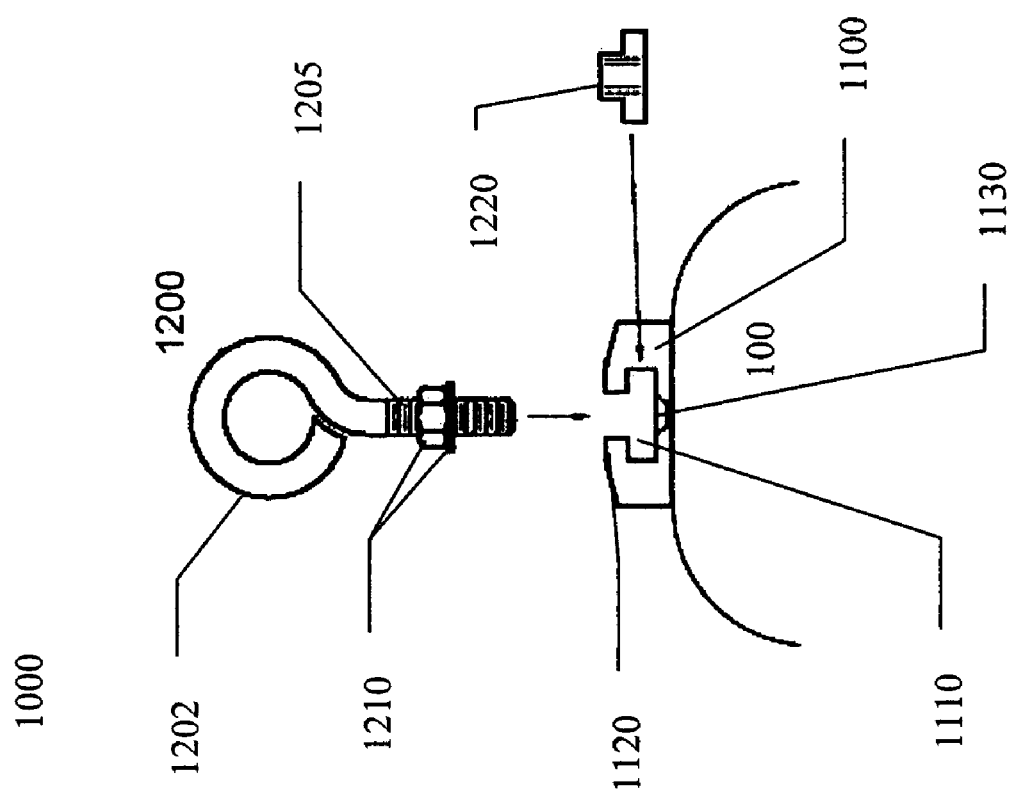

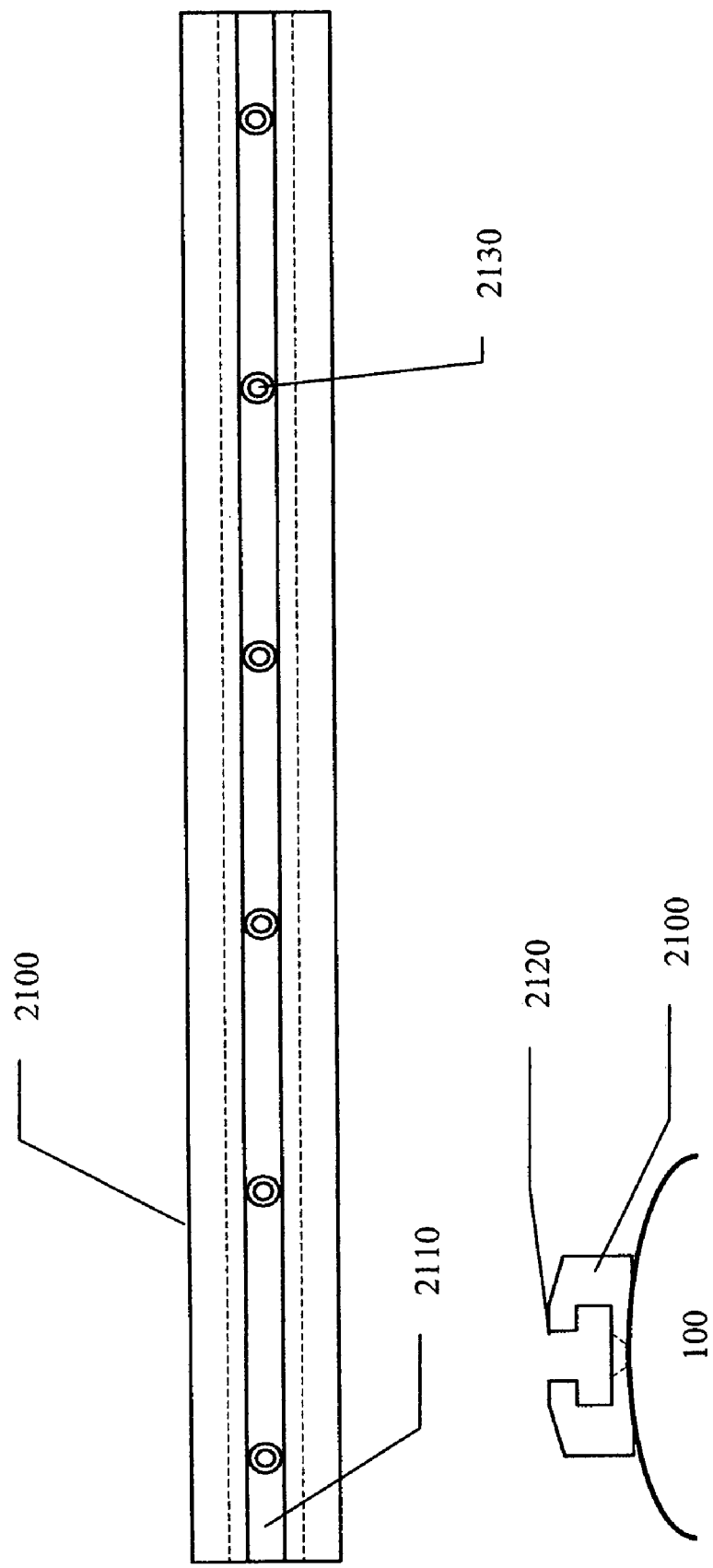

APPARATUS FOR SECURING OBJECTS TO VEHICLES OR TRAILERS

FIELD

The invention disclosed herein pertains to the field of vehicle accessories; more specifically the apparatus attaches to a vehicle, trailer, or the like and is used to tie, secure, attach or hold objects to the vehicle, trailer or the like.

BACKGROUND

Service vehicles such as pickups and trucks are used to haul or transport heavy, bulky objects. Most often objects are secured by ropes, wires or chains that are tied to the vehicle; usually the rope, wire or chain are secured by attachment to a portion of the vehicle, such as a bumper, or to the undercarriage of the vehicle.

Recently, some manufacturers, such as Ford Motor Company are providing an apparatus, attached to a pickup within the pickup bed, the apparatus for attaching and holding objects to and within the bed of the pickup. However, as will be disclosed below, even this apparatus has shortcomings.

SUMMARY

Therefore in recognition of, and in response to the need for a better apparatus for securing and holding objects to a vehicle, hereafter is disclosed an apparatus comprising: (1) At least two rails. The rails are fixed and attached to the vehicle or the like, each rail having a channel, each channel enclosed by projection of the rail, and (2) At least one attachment device, the attachment device received by the channel of one of the rails, whereby the attachment device attaches or secures an object to the rail, the attachment device locking against both projections of each rail. The attachment device is made and configured to slide within the one rail, and also configured to be immovably fixed at a desired position within the one rail by operating a locking mechanism that is part of the attachment device. Further, by operating the locking mechanism, the attachment device is released or unlocked from the channel so the attachment device can slide within the one rail, the attachment device constrained to slide within the rail channel by the rail projections.

The objects and advantages of the invention will appear from the disclosure to follow. In the disclosure reference is made to the accompanying drawings, which form a part hereof and in which is shown by way of illustration specific embodiments in which the invention may be practiced. These embodiments will be described in sufficient detail to enable those skilled in the art to practice the invention, and it is to be understood that other embodiments may be utilized and that structural changes may be made in details of the embodiments without departing from the scope of the invention.

BRIEF DESCRIPTION OF DRAWINGS

FIG. 1A shows an exemplary embodiment of the apparatus, the apparatus comprising rails that are immovably held or fixed to a vehicle, each rail having at least one attachment device that is received by a channel in the rail, wherein the attachment device may be locked in a fixed position with respect to the rail.

FIG. 2 shows one exemplary embodiment of a rail, the rail attached to a vehicle or trailer by a screw, bolt or by adhesive; the rail seen from one end and showing the channel made in the rail.

DETAILED DESCRIPTION

An Exemplary Embodiment

With reference to FIG. 1A, an apparatus 1000 for attaching or holding and securing objects to a vehicle 100, trailer, platform, building, floor or the like. The vehicle may be the top of a car, station wagon, a truck, trailer, pickup, or any other conveyance for transporting or carrying objects.

Figure 1B:
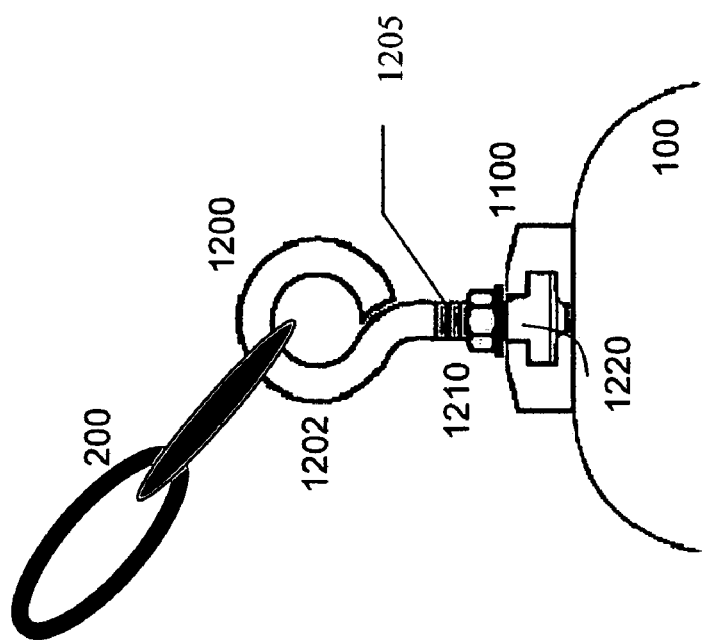
FIG. 1B shows an attachment device attached to each of two rails, which are screwed or bolted to vehicle fenders, and a chain for securing an object to the apparatus.
Figure 1B:
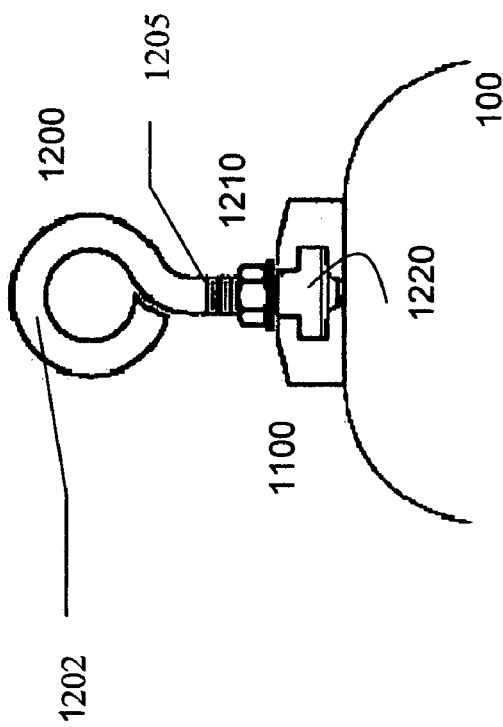

With reference to FIG. 1A and FIG. 1B the apparatus 1000 comprises at least two rails 1100. The rails 1100 are fixed and attached to the vehicle 100 or the like, each rail 1100 having a channel 1110, with each channel 1110 enclosed by a projection 1120 that is part of the rail. With reference to FIG. 1B the apparatus 1000 includes at least one attachment device 1200, the attachment device 1200 received by the channel 1110 of one of the rails 1100, the attachment device 1200 sliding within the recess formed by the channel 1110 of a rail and its projection 1120, whereby a hook 1202 on the attachment device 1200 attaches or secures an object to the rail by a tether such as a chain, cable or the like 200. The attachment device 1200 is configured to slide within the one rail 1100, and also configured to be immovably fixed at a desired position within the rail 1100 by operating a locking mechanism 1210 1220 that is part of the attachment device 1200. By operating the locking mechanism 1210 1220, the attachment device 1200 is released or unlocked from the channel 1110 so the attachment device 1200 can slide within the one rail 1110, constrained by the projections 1120 of the rail 1100.

In FIG. 2, the rail 2100 is attached to a vehicle 100 by a fastener that passes through an opening 2130 made in the rail 2100.

Again with reference to FIG. 1A, the attachment device 1200 includes a slide 1220, which receives the locking mechanism 1210 1220 and, when constrained by the projection 1120 of a rail 1100, the attachment device 1200 is prevented from moving within the rail 1100. In case of the exemplary embodiment, the locking mechanism 1210 1220 comprises a vertical portion having threads 1205 and a nut 1215, the threads received by threads in the slide 1220 and by combined pressure of the nut 1215, and slide 1220, the attachment 1200 is held in the rail 1100.

With reference to FIG. 2, an exemplary embodiment of a rail 2100 is made from hard, durable material such as metal, plastic or composite substance capable of sustaining heavy loads and high stress. The rail 2100 has a channel 2110, the top of the channel 2110 having a "lip" or projection 2120.

With reference to FIG. 2, the exemplary rail 2100 has means 2130 for attaching the rail 2000 to a floor, building or conveyance. FIG. 2 shows a hole 2130 made at the bottom of the channel 2110, the hole 2130 made to receive a bolt, screw or the like, which will attach the rail 2100 to the floor, building or vehicle.

A Preferred Embodiment of the Attachment Device

With reference to FIG. 3A, an exemplary embodiment of an attachment device 3200 comprises a body 3210 for securing a rope, wire or chain. The body 3210 is made as the handle of a cam lock having cams 3210 3220. The cams of the lock 3210 3220 are made so that when the body is rotated into a vertical position, the cams 3210 3220 lock the attachment device 3200 by wedging upon the projections of the rail. It should be noted that the cams 3210 3220 wedge upon both projections of the rail as opposed to being held by a single portion of the rail as in the Ford Motor attachment device.

Again with reference to FIG. 3A, the attachment device body 3100 has a hole 3115 for receiving a pin 3116, the pin 3116 passing through a hole 3315 in the handle 3110 of the slide 3300, the slide received by the rail. It can be seen that the handle 3110 fits within a slot 3120 of the body 3100, with the handle 3110 made so that the hole 3315 made in the handle 3110 aligns with the hole 3115 in the attachment device body 3100.

With reference to FIG. 3B, when the slide 3300 is received within the rail 3800, and the handle 3110 is attached to the body 3100, the fore 3210 and aft 3220 of the locking cam are placed to engage the projections 3850 of the rail 3800 when the body is rotated with respect to the rail. As the body 3100 is rotated into a vertical position, the cam lock 3210 3220 engages the projections 3850 of the rail 3800, and pulls the slide 3300 up against the projections 3850 of the rail 3800.

With reference to FIG. 3C, when the body 3100 is rotated into a vertical position with respect to the rail 3800, the cam lock 3210 3220 presses down against the top of the rail projections 3850 as the slide 3300 is pulled against the bottom of the rail projections 3850. In this position a rope, chain or the like 3900 is attached to the body 3100 in order to hold an object.

While the invention may be practiced in other embodiments and variations thereof, it will be appreciated that the invention is most properly defined and delineated by the claims that follow.

I claim:

1. An apparatus for removably attaching an object to a vehicle, the object attached to the apparatus by a tether, the apparatus comprising:
    at least two rails attached to the vehicle, each rail having a channel, the channel partially enclosed by projections; and
    at least one attachment device, the attachment device received by and sliding within the channel of one of the rails, the attachment device comprising:
        a hook for attaching the tether, the hook made at the top of a vertical member having a threaded bottom part, the threaded bottom part received by and passing through the projections;
        a locking mechanism comprising a nut threaded onto the threaded bottom part, the nut resting on top of the projections, the locking mechanism further comprising a slide positioned within the channel, the slide having a threaded portion receiving and holding the threaded bottom part of the vertical member;
    whereby the attachment device is held at a fixed position in the rail by screwing the vertical member into the slide.

2. An apparatus for holding an object in a vehicle, the apparatus comprising at least two rails, each rail having a channel, each rail attached to the vehicle, with each rail having at least one sliding attachment, the sliding attachment sliding within a rail channel, each sliding attachment comprising:
    a vertical member, the upper portion of the vertical member having a hook, the hook receiving and holding a tether attached to the object, the lower portion of the vertical member threaded, the threaded portion received by and extending above and below the rail channel;
    a nut threaded onto the upper part of the threaded portion and resting on top of the channel, and;
    a slide held and moving within the channel, the slide having threads for receiving and holding the lower part of the threaded portion;
    whereby the sliding attachment is held at a fixed position on the rail by screwing the vertical member into the slide.

3. A method for holding an object in a vehicle, the method comprising:
    providing the apparatus of claim 2;
    providing a tether;
    attaching the tether to the object;
    attaching the tether to the hook, and;
    sliding the sliding attachment until the tether is taut, and;
    screwing the vertical member into the slide.

* * * * *